US012473945B2

(12) United States Patent
Raines et al.

(10) Patent No.: US 12,473,945 B2
(45) Date of Patent: Nov. 18, 2025

(54) SOCKET JOINT WITH SEALED WEAR INDICATOR AND METHOD OF MANUFACTURE

(71) Applicant: FEDERAL-MOGUL MOTORPARTS LLC, Southfield, MI (US)

(72) Inventors: Rachael Raines, Harrisonburg, VA (US); Dustin Schrieber, Waterloo, IL (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 521 days.

(21) Appl. No.: 17/890,429

(22) Filed: Aug. 18, 2022

(65) Prior Publication Data

US 2024/0060530 A1 Feb. 22, 2024

(51) Int. Cl.
*F16C 11/06* (2006.01)
*F16C 11/08* (2006.01)

(52) U.S. Cl.
CPC ........ *F16C 11/0647* (2013.01); *F16C 11/083* (2013.01); *Y10T 403/20* (2015.01)

(58) Field of Classification Search
CPC .............. F16C 11/0642; F16C 11/0647; F16C 11/0652; F16C 11/08; F16C 11/083; F16C 11/086; Y10T 403/20; Y10T 403/32713; Y10T 403/32729; Y10T 403/72737; Y10T 403/32745; Y10T 403/32754; Y10T 403/32762; Y10T 403/32811
USPC ......... 403/27, 132, 134, 135, 136, 137, 138, 403/144
See application file for complete search history.

(56) References Cited

U.S. PATENT DOCUMENTS

| | | | |
|---|---|---|---|
| 2,912,267 A | * | 11/1959 | Latzen ................ F16C 11/0642 403/130 |
| 3,791,748 A | | 2/1974 | Goodrich, Jr. et al. |
| 3,813,178 A | | 5/1974 | Herbenar et al. |
| 3,850,443 A | | 11/1974 | Hassan |
| 4,017,197 A | | 4/1977 | Farrant |
| 4,070,121 A | | 1/1978 | Graham |
| 4,358,211 A | | 11/1982 | Goodrich, Jr. et al. |
| 4,626,121 A | | 12/1986 | Tajima et al. |
| 4,749,299 A | | 6/1988 | Swanson |
| 6,152,637 A | | 11/2000 | Maughan |
| 8,342,769 B2 | * | 1/2013 | Elterman ............ F16C 11/0642 403/136 |
| 9,541,124 B2 | | 1/2017 | Gräber et al. |

(Continued)

FOREIGN PATENT DOCUMENTS

| | | | | |
|---|---|---|---|---|
| GB | 623506 A | * | 5/1949 | .......... F16C 11/0647 |
| GB | 1542486 A | * | 3/1979 | .......... F16C 11/0647 |

(Continued)

*Primary Examiner* — Josh Skroupa
(74) *Attorney, Agent, or Firm* — REISING ETHINGTON P.C.

(57) ABSTRACT

A socket joint includes a stud, a wear indicator configured to indicate a degree of wear relating to the stud or relating to a position of the stud, an elastomeric seal, and a Belleville washer. The elastomeric seal is located at least partially between the wear indicator and the Belleville washer. In some implementations, a domed cover plate is configured to help create a sealing engagement between the elastomeric seal, the wear indicator, and the Belleville washer when the cover plate is pressed into the internal bore of the housing of the socket joint.

18 Claims, 3 Drawing Sheets

(56) References Cited

U.S. PATENT DOCUMENTS

| | | | |
|---|---|---|---|
| 9,956,733 B2 * | 5/2018 | Idies | F16C 11/0666 |
| 10,544,825 B2 * | 1/2020 | Parker | F16C 11/0628 |
| 10,844,900 B2 * | 11/2020 | Reddehase | F16C 11/086 |
| 2006/0029461 A1 | 2/2006 | Benick et al. | |
| 2019/0277334 A1 * | 9/2019 | Sugg | F16C 11/0642 |
| 2020/0018347 A1 | 1/2020 | Parker et al. | |

FOREIGN PATENT DOCUMENTS

| | | | | |
|---|---|---|---|---|
| JP | S50135873 U | | 11/1975 | |
| JP | S58112723 U | | 8/1983 | |
| JP | 60208621 A | * | 10/1985 | F16C 11/0647 |
| JP | 62002076 A | * | 1/1987 | F16K 5/06 |
| JP | 62017421 A | * | 1/1987 | F16C 11/0647 |
| JP | 62083513 A | * | 4/1987 | F16C 11/06 |

* cited by examiner

SOCKET JOINT WITH SEALED WEAR INDICATOR AND METHOD OF MANUFACTURE

TECHNICAL FIELD

This invention generally relates to vehicle components and, in particular, to socket joints used in steering and suspension systems.

BACKGROUND

In socket joints, thicker rubber cushions were oftentimes used to seal the joint assemblies between a wear indicator feature and a cover plate. The rubber cushions were used to seal and also acted as a preload. However, the amount of preloading cannot be controlled as precisely with a rubber cushion, as compared to a Belleville washer for example. Accordingly, a need exists for an adequately sealed wear indicator when a Belleville washer is used as a preload as opposed to a rubber cushion.

SUMMARY

According to one embodiment, there is provided a socket joint comprising a stud, a wear indicator configured to indicate a degree of wear relating to the stud or relating to a position of the stud, an elastomeric seal, and a Belleville washer. The elastomeric seal is located at least partially between the wear indicator and the Belleville washer.

In some embodiments, the wear indicator is a bearing.

In some embodiments, the elastomeric seal has an annular shape with an inner diameter and an outer diameter.

In some embodiments, the inner diameter of the elastomeric seal surrounds an axially extending portion of the wear indicator.

In some embodiments, the elastomeric seal has a top surface between the inner diameter and the outer diameter and a bottom surface opposite the top surface between the inner diameter and the outer diameter, and the top surface rests directly against the Belleville washer and the bottom surface rests directly against the wear indicator.

In some embodiments, a domed cover plate is configured to create a sealing engagement between the elastomeric seal, the wear indicator, and the Belleville washer.

In some embodiments, the domed cover plate sits in a groove of a housing with the elastomeric seal and the Belleville washer being seated between the groove and the wear indicator.

In some embodiments, the Belleville washer has a frustoconical shape that is oriented in a concave down position.

In some embodiments, the elastomeric seal has a thickness between 0.03125 inches and 0.0625 inches, inclusive.

In accordance with another embodiment, there is provided a socket joint comprising a stud, a wear indicator configured to indicate a degree of wear relating to the stud or relating to a position of the stud, an elastomeric seal, a Belleville washer, and a domed cover plate configured to create a sealing engagement between the elastomeric seal, the wear indicator, and the Belleville washer.

In some embodiments, the elastomeric seal is located at least partially between the wear indicator and the Belleville washer.

In some embodiments, the wear indicator is a bearing.

In some embodiments, the elastomeric seal has an annular shape with an inner diameter and an outer diameter, and the inner diameter of the elastomeric seal surrounds an axially extending portion of the wear indicator.

In some embodiments, the elastomeric seal has a top surface between the inner diameter and the outer diameter and a bottom surface opposite the top surface between the inner diameter and the outer diameter, and the top surface rests directly against the Belleville washer and the bottom surface rests directly against the wear indicator.

In some embodiments, the domed cover plate sits in a groove of a housing, with the elastomeric seal and the Belleville washer being seated between the groove and the wear indicator.

In some embodiments, the Belleville washer has a frustoconical shape that is oriented in a concave down position.

In some embodiments, the elastomeric seal has a thickness between 0.03125 inches and 0.0625 inches, inclusive.

In accordance with another embodiment, there is provided a method of manufacturing a socket joint, comprising the steps of: placing a stud in a housing; placing a wear indicator on the stud; placing an elastomeric seal on the wear indicator; placing a Belleville washer on the elastomeric seal; and pressing a cover plate to create a sealing engagement between the elastomeric seal, the wear indicator, and the Belleville washer.

In some embodiments, an outer diameter of the elastomeric seal is less than an outer diameter of the Belleville washer before the cover plate is pressed.

In some embodiments, the elastomeric seal is cured.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The socket joint and manufacturing methods described herein provide a sealing solution that enables use of a Belleville washer and a domed cover plate. Sealing components help ensure the retention of grease within an assembly throughout the part's life as well as help to prevent water intrusion into the socket. This is largely achieved through the use of a dust boot on the stud and either a flat cover plate or a domed cover plate with a grease fitting on the other end of the housing. However, when introducing a wear indicator feature, these cover plate designs do not work, as the wear indicator must be visible for inspection, which typically comes through the inner diameter of the cover plate. This creates a need for a sealing feature which can create a seal between the bottom surface of the cover plate and the top surface of the wear indicator feature. While rubber cushions can be used as both a seal and act as a preload, rubber cushions are quickly being replaced in assemblies by Belleville washers due to both cost and performance measures. Using Belleville washers as the preloads allows for greater control over the initial set preload as well as axial movement within the assembly. They can also give better insight to degradation within the socket as compared to rubber cushions. The present embodiments serve to seal wear-indicator assemblies that use both a fully-domed press-in cover plate and a Belleville washer.

Figure 1:
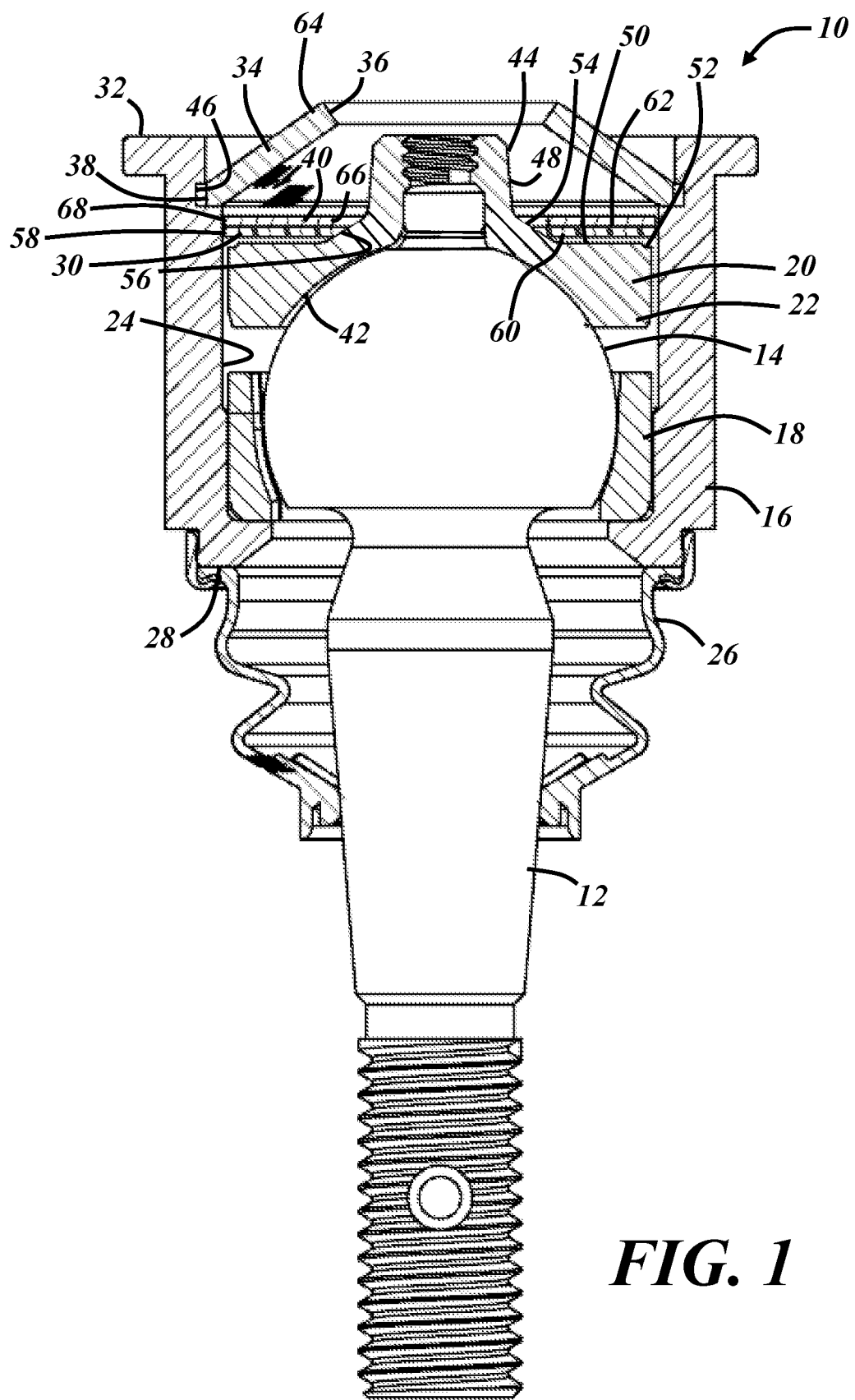
FIG. 1 is a cross-section view of a socket joint according to one embodiment.
Figure 2:
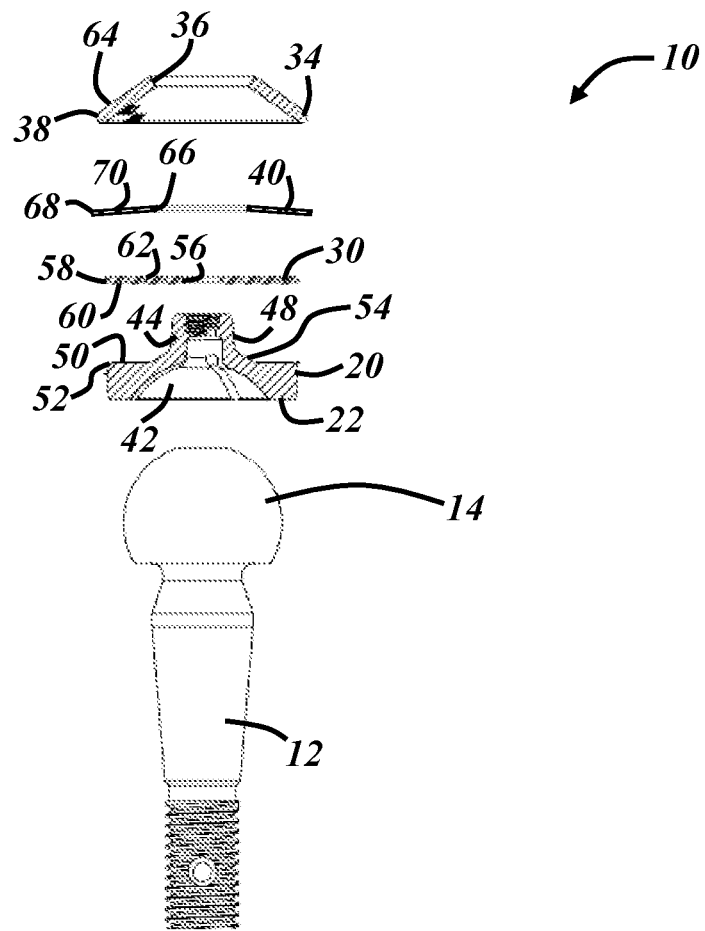
FIG. 2 is an exploded, cross-section view of the socket joint of FIG. 1.
Figure 2:
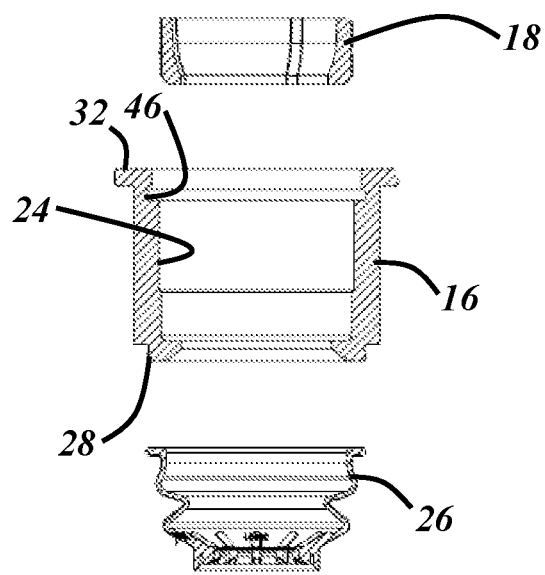
Figure 3:
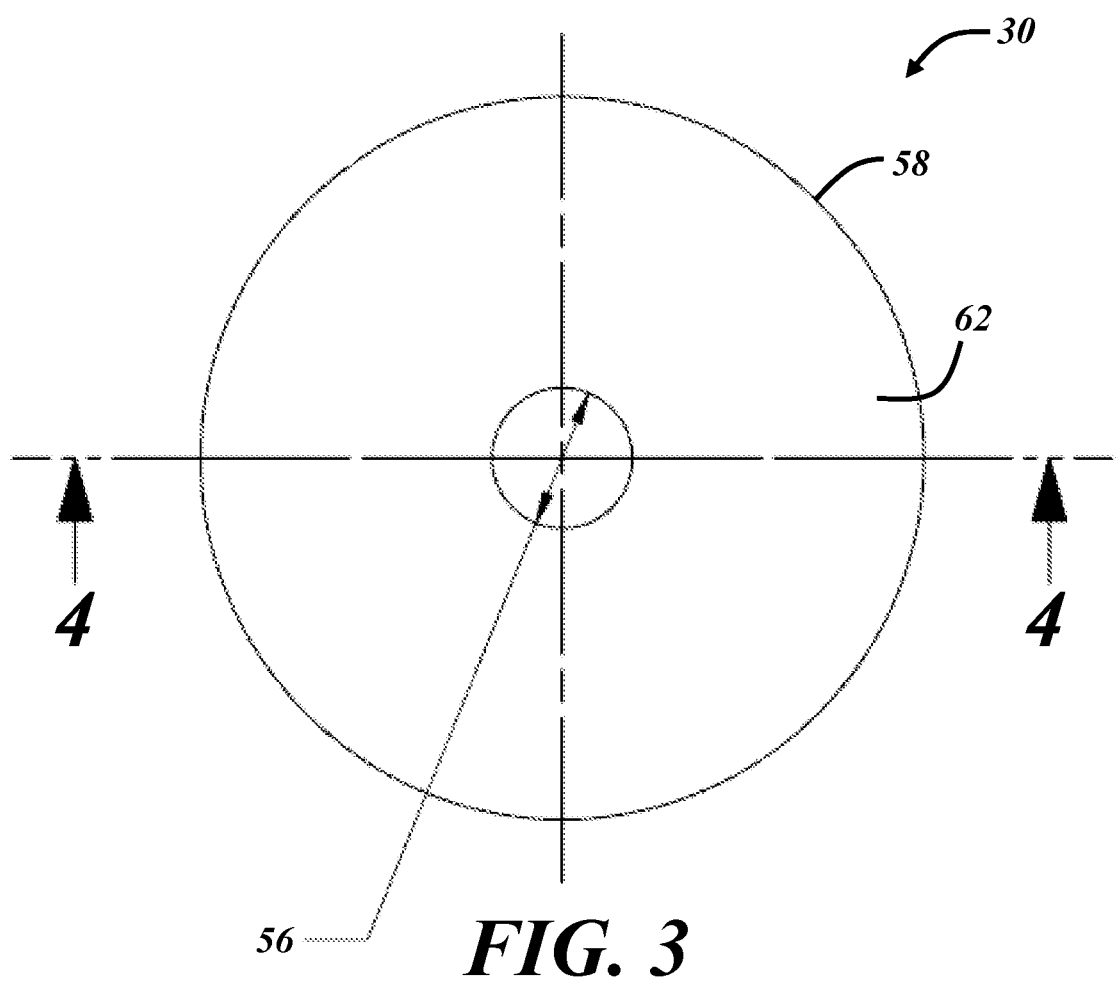
FIG. 3 is a top view of an elastomeric seal of the socket joint of FIGS. 1 and 2.
Figure 4:
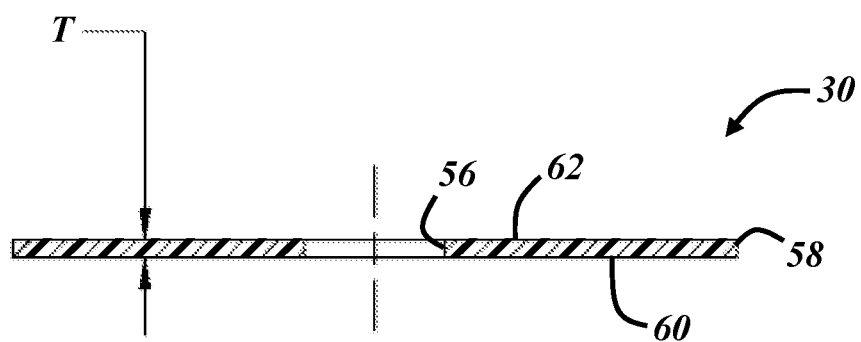
FIG. 4 is a cross-section view of the elastomeric seal of FIGS. 1-3.

FIGS. 1 and 2 illustrate one embodiment of a socket joint 10. The socket joint 10 includes a stud 12 which has a ball end 14. A housing 16 generally surrounds a lower bearing 18 and a wear indicator 20. The wear indicator 20 is an upper bearing 22, that with the lower bearing 18, bear against the stud 12, and more particularly, against the ball end 14 of the stud 12. It should be noted, however, that the socket joint 10 may incorporate any moveable socket configuration and is not limited to the explicitly illustrated ball joint shown in the figures and described herein. The socket joint 10 may also include other features, such as a grease fitting, a pressure cup or other operational-based features depending on the desired use and placement of the joint within a vehicle steering and suspension system.

The housing 16 is a generally circular cylindrical component that surrounds the internal components of the joint 10. The housing 16 has an internal bore 24 in which the stud 12, the bearing 18, and the wear indicator 20 are situated. The internal bore 24 houses grease to lubricate the various internal components of the joint 10, and to seal the grease, a dust boot 26 is used on a first or bottom end 28 of the housing 16 and an elastomeric seal 30 is used to seal a second or top end 32 of the housing. In this embodiment, since the cover plate 34 has an annular shape with an internal diameter 36 and an outer diameter 38, in order to provide visual access to the wear indicator 20, the elastomeric seal 30 serves to seal the internal bore 24 of the housing 16. As detailed further below, since the elastomeric seal 30 has a much thinner profile as compared to a rubber cushion, a Belleville washer 40 is used as a preload, which provides more consistent values in inspection readings and improves axial deflection performance.

The wear indicator 20 in this embodiment is an upper bearing 22 that is configured to indicate a degree of wear relating to the stud 12. As the ball end 14 of the stud 12 bears against a semi-spherical bearing surface 42 of the wear indicator 20, the position of an axially extending portion 44 will change with respect to the cover plate 34. Since the cover plate 34 is stationarily seated in a radial groove 46 of the internal bore 24 in the housing 16, a visual inspection of the axially extending portion 44 through the inner diameter 36 of the cover plate allows for an estimate of the degree of wear of the internal components of the joint 10. The axially extending portion 44 has an outer diameter 48 that extends up from a planar seating surface 50, which has an outer diameter 52 that is larger than the outer diameter 48 of the axially extending portion 44. A sloped transition surface 54 is situated between the axially extending portion 44 and the planar seating surface 50. The sloped transition surface 54 of the wear indicator 20 provides an angular transition between the orthogonally related axially extending portion 44 and planar seating surface 50. It is also possible for the wear indicator 20 to take other forms other than the particularly illustrated upper bearing 22. For example, the wear indicator 20 could be a visual indicator that appears over time instead of a feature that disappears or recesses over time (e.g., one or more indicator holes), to cite one example.

The elastomeric seal 30 is situated directly between the planar seating surface 50 of the wear indicator 20 and the Belleville washer 40. This arrangement allows for the seal 30 to be situated on the flat or planar seating surface 50. If the elastomeric seal 30 was located between the cover plate 34 and the Belleville washer 40, this arrangement may not seal as well as compared to the illustrated embodiment, since the seal 30 would have to seal primarily against an angled or sloped surface. Accordingly, the illustrated embodiment provides for an improved and more predictable seal since the seal 30 is situated directly on the planar seating surface 50 of the wear indicator 20 and is less impacted by movement of the Belleville washer 40. Moreover, this arrangement of having the seal 30 between the wear indicator 20 and the Belleville washer 40 helps to avoid issues with the interference between the inner diameter of the Belleville washer and the outer diameter 48 of the axially extending portion 44 of the upper bearing 22. The seal 30 being below the Belleville washer 40 allows for the washer to be lifted up slightly so that it can fully compress if needed without that interference. If the seal 30 was above the Belleville washer 40, then it may be necessary to add additional material to the top surface of the wear indicator 20, add a spacer of some kind, or redesign the Belleville washer 40.

The elastomeric seal 30 has an annular shape with an inner diameter 56 and an outer diameter 58. The elastomeric seal 30 has a first or bottom surface 60 and a second or top surface 62 that face and directly contact the wear indicator 20 and the Belleville washer 40, respectively. Each of the bottom surface 60 and the top surface 62 are planar surfaces extending between the inner diameter 56 and the outer diameter 58. The inner diameter 56 is configured to rest against and directly contact the sloped transition surface 54 of the wear indicator 20, and the outer diameter 58 is configured to rest against and directly contact the internal bore 24 of the housing 16. This arrangement between the sloped transition surface 54 and the internal bore 24 of the housing 16 helps improve the sealing engagement of the elastomeric seal 30, and can create a sheared or angled edge at the inner diameter 56. In one embodiment, the inner diameter 56 is approximately 0.25-0.30 inches inclusive, or more preferably, 0.28 inches, and the outer diameter 58 is approximately 1.4-1.6 inches inclusive, or more preferably, 1.44 inches. However, these dimensions can vary depending on the desired specifications of the socket joint 10.

The thickness T of the elastomeric seal 30 is configured to be as thin as possible without spring feedback, which is distinguishable from thicker rubber cushions used as preloads without a Belleville washer. This provides a more accurate and tunable preload because the Belleville washer 40 is used to control the preload instead of a thicker rubber cushion. In one embodiment, the thickness T of the elastomeric seal 30 is between about $1/32$ (0.03125) inches and $1/16$ (0.0625) inches, inclusive, or more preferably, 0.035 inches, plus or minus 0.01 inches. This thickness T is orders of magnitude smaller than thicker rubber cushions that are used as preloads without a Belleville washer, which need to be about 0.25 to 0.5 inches, inclusive, to adequately seal while providing preload. Instead, with the current socket joint 10, the combination of the elastomeric seal 30, Belleville washer 40, and domed cover plate 34, an adequate seal can be provided with a measurably more accurate preload. Moreover, minimizing the thickness of the elastomeric seal 30 can help decrease noise and decrease impact damages through improved control of the spring seat.

The elastomeric seal 30 is advantageously made from a flexible material that can be sandwiched between the more rigid wear indicator 20 and the Belleville washer 40. In an advantageous embodiment, the elastomeric seal 30 is made entirely of a rubber-like material such as a polyester thermoplastic polyurethane. Other materials include a natural rubber, a fluorocarbon rubber, or other thermoplastic polyurethanes, to cite a few examples. Preferably, the material for the elastomeric seal 30 can be exposed to oil and incur no swelling or negligible swelling. If the socket joint 10 is to be used within approximately 30 days of production, the elastomeric seal 30 can advantageously be post-cured by either heating the parts to 100° C. (plus or minus 5° C.) for about 20 hours plus 23° C. for 24 hours, or to 23° C. (plus or minus 5° C.) for about 672 hours. This additional curing step in the manufacturing process helps adequately harden the rubber-like material in place to ensure a proper setting of the elastomeric seal 30.

The cover plate 34 helps create a sealing engagement between the wear indicator 20, the elastomeric seal 30, and the Belleville washer 40. In the illustrated embodiment, the cover plate 34 has a domed profile 64. During manufacture of the socket joint 10, the cover plate 34 is placed in a concave down position and then pressed into the radial groove 46 in the internal bore 24 of the housing 16. This then helps to seat the elastomeric seal 30 such that its outer diameter 58 directly contacts the internal bore 24 of the housing 16 and its inner diameter 56 directly contacts the sloped transition surface 54 of the wear indicator 20.

The Belleville washer 40 is situated between the cover plate 34 and the elastomeric seal 30. As detailed herein, as opposed to thicker rubber or foam cushions or the like, the combination of the elastomeric seal 30 and the Belleville washer 40 provides for adequate sealing of grease inside the joint 10 and water from outside the joint, while providing a more improved and consistent preload, particularly with respect to axial deflection performance. With particular reference to FIG. 2, the Belleville washer 40 has an inner diameter 66, an outer diameter 68, and a generally frusto-conical shape 70. As shown, the Belleville washer 40 is configured in the concave down position and then installed within the housing 16 such that the inner diameter 66 extends around the axially extending portion 44 of the wear indicator 20. The outer diameter 68 of the Belleville washer 40 may actually be larger than the outer diameter 58 of the elastomeric seal 30 prior to installation, as schematically illustrated in FIG. 2. Then, upon compression, the elastomeric seal 30 expands such that the outer diameter 58 of the seal coincides with the outer diameter 68 of the Belleville washer 40 within the internal bore 24 of the housing 16. This can create an improved seal of the joint 10. Additionally, use of the Belleville washer 40, as opposed to thicker rubber cushions, allows for greater control of the initial set preload as well as axial movement within the joint 10. Moreover, the Belleville washer 40 can give better insight to degradation within the socket 10 as compared to rubber cushions, and a Belleville has longer durability compared to a thicker rubber cushion that has a greater propensity to set over time.

During manufacture, the lower bearing 18, which may be a knurled steel bearing, is placed into the internal bore 24 of the housing 16. Then, the stud 12 is placed into the counterbore of the lower bearing 18. The wear indicator 20/upper bearing 22 is placed into the internal bore 24 of the housing 16 such that the semi-spherical bearing surface 42 contacts the ball end 14 of the stud 12. The elastomeric seal 30 is then placed upon the planar seating surface 50 of the wear indicator 20. The inner diameter 56 of the elastomeric seal 30 is situated around the axially extending portion 44 of the wear indicator 20. The Belleville washer 40 is placed on top of the seal 30 in a concave down orientation, and the cover plate 34 is also situated in a concave down orientation on top of the Bellville washer. The cover plate 34 is then pressed into the housing 16 until the lower bearing 18 is fully seated, which allows for the cover plate 34 to be pressed in at the same time as the lower bearing 18. This can improve manufacturing efficiencies by eliminating an extra pressing step for the lower bearing 18. Additionally, pressing the cover plate 34 helps to properly seat the elastomeric seal 30 between the wear indicator 20 and the Belleville washer 40.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A socket joint, comprising:
   a stud;
   a wear indicator configured to indicate a degree of wear relating to the stud or relating to a position of the stud;
   an elastomeric seal; and
   a Belleville washer, wherein the elastomeric seal is located at least partially between the wear indicator and the Belleville washer, wherein a cover plate is configured to create a sealing engagement between the elastomeric seal, the wear indicator, and the Belleville washer, wherein the cover plate sits in a groove of a housing with the elastomeric seal and the Belleville washer being seated between the groove and the wear indicator.

2. The socket joint of claim 1, wherein the wear indicator is a bearing.

3. The socket joint of claim 1, wherein the elastomeric seal has an annular shape with an inner diameter and an outer diameter.

4. The socket joint of claim 3, wherein the inner diameter of the elastomeric seal surrounds an axially extending portion of the wear indicator.

5. The socket joint of claim 3, wherein the elastomeric seal has a top surface between the inner diameter and the outer diameter and a bottom surface opposite the top surface between the inner diameter and the outer diameter, and wherein the top surface rests directly against the Belleville washer and the bottom surface rests directly against the wear indicator.

6. The socket joint of claim 1, wherein the cover plate is a domed cover plate.

7. The socket joint of claim 1, wherein the Belleville washer has a frustoconical shape that is oriented in a concave down position.

8. The socket joint of claim 1, wherein the elastomeric seal has a thickness between 0.03125 inches and 0.0625 inches, inclusive.

9. A socket joint, comprising:
a stud;
a wear indicator configured to indicate a degree of wear relating to the stud or relating to a position of the stud;
an elastomeric seal;
a Belleville washer; and
a domed cover plate configured to create a sealing engagement between the elastomeric seal, the wear indicator, and the Belleville washer, wherein the domed cover plate sits in a groove of a housing, with the elastomeric seal and the Belleville washer being seated between the groove and the wear indicator.

10. The socket joint of claim 9, wherein the elastomeric seal is located at least partially between the wear indicator and the Belleville washer.

11. The socket joint of claim 9, wherein the wear indicator is a bearing.

12. The socket joint of claim 9, wherein the elastomeric seal has an annular shape with an inner diameter and an outer diameter, and the inner diameter of the elastomeric seal surrounds an axially extending portion of the wear indicator.

13. The socket joint of claim 12, wherein the elastomeric seal has a top surface between the inner diameter and the outer diameter and a bottom surface opposite the top surface between the inner diameter and the outer diameter, and wherein the top surface rests directly against the Belleville washer and the bottom surface rests directly against the wear indicator.

14. The socket joint of claim 9, wherein the Belleville washer has a frustoconical shape that is oriented in a concave down position.

15. The socket joint of claim 9, wherein the elastomeric seal has a thickness between 0.03125 inches and 0.0625 inches, inclusive.

16. A method of manufacturing a socket joint, comprising the steps of:
placing a stud in a housing;
placing a wear indicator on the stud;
placing an elastomeric seal on the wear indicator;
placing a Belleville washer on the elastomeric seal; and
pressing a cover plate to create a sealing engagement between the elastomeric seal, the wear indicator, and the Belleville washer, wherein the cover plate sits in a groove of a housing with the elastomeric seal and the Belleville washer being seated between the groove and the wear indicator.

17. The method of claim 16, wherein an outer diameter of the elastomeric seal is less than an outer diameter of the Belleville washer before the cover plate is pressed.

18. The method of claim 16, comprising the step of curing the elastomeric seal.

* * * * *